US008388717B2

(12) United States Patent  
Livingstone et al.

(10) Patent No.: US 8,388,717 B2  
(45) Date of Patent: Mar. 5, 2013

(54) FURNACE FILTER ADAPTERS AND BRACES

(75) Inventors: David E. Livingstone, London (CA); Darryl F. Klassen, London (CA); David A. Beckett, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 214 days.

(21) Appl. No.: 12/561,733

(22) Filed: Sep. 17, 2009

(65) Prior Publication Data

US 2010/0101197 A1    Apr. 29, 2010

Related U.S. Application Data

(60) Provisional application No. 61/098,411, filed on Sep. 19, 2008.

(51) Int. Cl.
*B01D 46/00* (2006.01)
*B01D 46/10* (2006.01)

(52) U.S. Cl. .......... 55/481; 55/482; 55/495; 55/496; 55/506; 55/511; 55/DIG. 6; 55/DIG. 31; 206/223

(58) Field of Classification Search ............ 55/487, 55/511, 501, 495, 496, 497, 499, DIG. 31, 55/DIG. 35
See application file for complete search history.

(56) References Cited

U.S. PATENT DOCUMENTS

| 4,584,005 | A | * | 4/1986 | Allan et al. | 55/499 |
| 5,944,860 | A | * | 8/1999 | Mack et al. | 55/492 |
| 5,968,217 | A | * | 10/1999 | Stein et al. | 55/496 |
| 6,027,542 | A | * | 2/2000 | Brandhofer et al. | 55/490 |
| 6,126,708 | A | * | 10/2000 | Mack et al. | 55/502 |
| 6,264,713 | B1 | * | 7/2001 | Lewis, II | 55/481 |
| 6,361,578 | B1 | * | 3/2002 | Rubinson | 55/487 |
| 6,485,538 | B1 | * | 11/2002 | Toyoshima | 55/490 |
| 6,716,267 | B2 | * | 4/2004 | Lawlor, Sr. | 55/506 |
| 6,793,703 | B1 | * | 9/2004 | Sledge et al. | 55/495 |
| 6,833,017 | B2 | * | 12/2004 | Quigley | 55/497 |
| 6,916,352 | B2 | * | 7/2005 | Sutton et al. | 55/483 |
| 7,524,362 | B2 | * | 4/2009 | Wu et al. | 96/15 |
| 7,575,617 | B2 | * | 8/2009 | Ferguson | 55/480 |
| 7,993,423 | B2 | * | 8/2011 | Kyllonen et al. | 55/345 |
| 2006/0042207 | A1 | * | 3/2006 | Jenkins et al. | 55/490.1 |
| 2010/0313535 | A1 | * | 12/2010 | Crook | 55/502 |

FOREIGN PATENT DOCUMENTS

| JP | 2000061232 | 2/2000 |
| JP | 2000111114 | 4/2000 |
| KR | 20000007149 | 4/2000 |

OTHER PUBLICATIONS

Pct International Search Report PCT/ISA/210.

* cited by examiner

*Primary Examiner* — Duane Smith
*Assistant Examiner* — Minh-Chau Pham
(74) *Attorney, Agent, or Firm* — David B. Patchett

(57) ABSTRACT

An adapter is provided for placement within a furnace filter bay having a flow of air therethrough. The filter bay is for receiving a furnace filter. The adapter includes a filter abutment face for abutment with at least a portion of the furnace filter, a mounting face parallel to the flow of air and attachment means permitting removable attachment of the adapter to the furnace filter bay. The adapter allows filters of smaller depth than the filters originally designed for use within the filter bay to be used, thereby eliminating the need for purchasing the original filters. A brace is also provided for the same purpose. A kit is described that includes the adapter and/or brace, along with instructions for installation thereof within the filter bay.

22 Claims, 16 Drawing Sheets

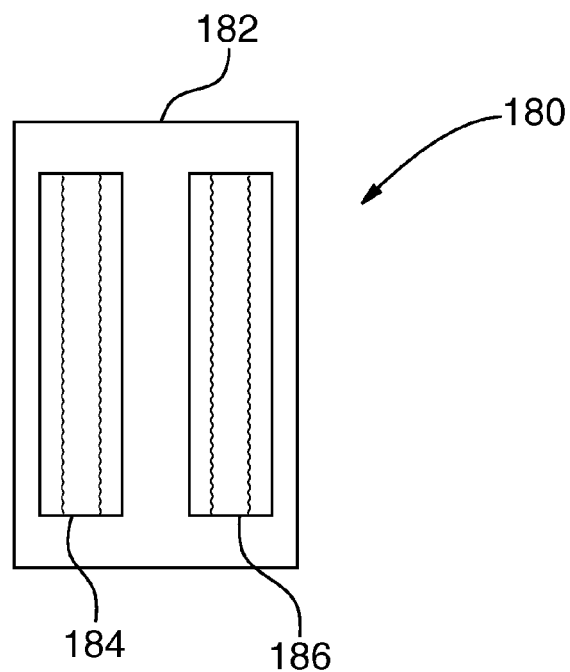
FIG.13A
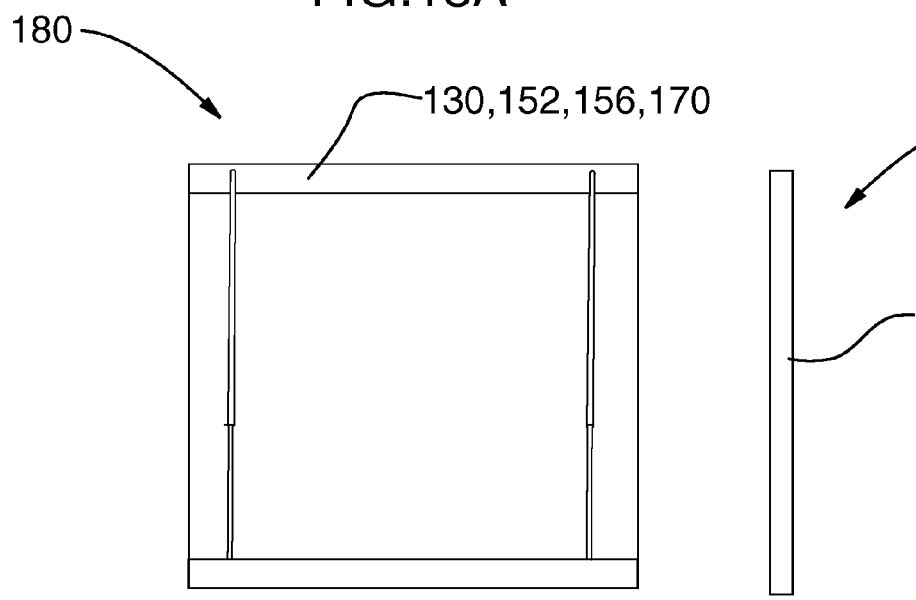 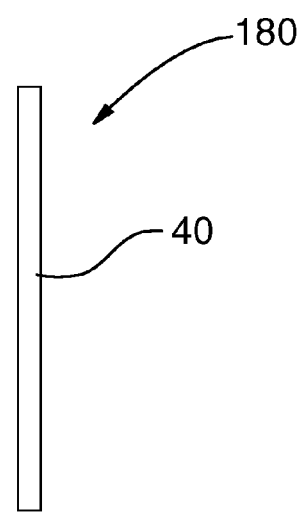
FIG.13B         FIG.13C

FURNACE FILTER ADAPTERS AND BRACES

CROSS REFERENCE TO RELATED APPLICATION

This application claims the benefit of U.S. Provisional Patent Application No. 61/098,411, filed Sep. 19, 2008, the disclosure of which is incorporated by reference herein in its entirety.

FIELD OF THE INVENTION

The invention relates to adapters and braces for insertion within large format furnace filter bays (those that accommodate furnace filters having a depth of 3-6") to allow use of a conventional filter (typically having a depth of about 1") in the bay. The adapters and braces are designed to be easily inserted and removed and may be customized in size to be suitable for use in a number of large format filter bays.

BACKGROUND

Heating and ventilation equipment utilizing a pressurized flow of air, for example forced air furnaces for use in heating residential and light commercial spaces, are equipped with a filter for use in removing airborne contaminants such as dust, debris, pollen, VOC's etc. from the air stream used to ventilate the space. Suitable filters for use in these applications are commonly described as furnace filters. Conventional furnace filters are approximately 1" in depth and are sold under a number of brand names; examples of conventional furnace filters are sold by 3M and its subsidiaries, such as 3M Canada, under the FILTRETE® brand name. In recent years, there has been a trend towards use of large format (having a depth of 3-6") furnace filter bays on new furnace installations. These bays are non-standard in size and accommodate a variety of different proprietary furnace filters. These proprietary large format filters are often expensive and can be difficult to find from retail suppliers. As a result, it would be desirable for owners of furnaces equipped with large format filter bays to be able to simply and easily retrofit those bays to accommodate conventional 1" furnace filters. It would be further desirable to provide the means to retrofit the filter bay as part of a kit for sale along with or in addition to the furnace filters.

U.S. Pat. No. 6,716,267, filed Oct. 18, 2001, discloses a multi-position furnace filter rack comprising a spring-loaded frame of adjustable dimensions. This furnace filter rack is relatively complex and would tend to make the price of a kit prohibitively expensive relative to simply purchasing the proprietary large format filters Referring to FIG. 2, another proposed solution is to provide a set of angle brackets shown at 200 and 202 and to pop-rivet the angle brackets 200 and 202 in place in the furnace filter bay. This permanently modifies the furnace filter bay so that it can be used with 1" filters thereafter. A problem with such a solution, however, is that a skilled tradesperson is typically required to pop-rivet or permanently fasten a set of angle brackets into place in the filter bay and so it is typically relatively expensive and/or difficult to implement such a solution.

Accordingly, there remains a need for a new solution to permit a furnace filter bay that has been made for a first larger size of air filter to accommodate a smaller second size of air filter.

SUMMARY OF THE INVENTION

According to an embodiment of the present invention, there is provided an adapter for placement within a furnace filter bay having a flow of air therethrough, the filter bay for receiving a furnace filter, the adapter comprising: a filter abutment face for abutment with at least a portion of the furnace filter; a mounting face parallel to the flow of air; and, attachment means permitting removable attachment of the adapter to the furnace filter bay.

According to another embodiment of the present invention, there is provided a furnace filter brace for placement within a furnace filter bay having a flow of air therethrough, the filter bay for receiving a furnace filter, the brace comprising: a filter abutment face for abutment with at least a portion of the furnace filter; a mounting face for abutment against an interior portion of the filter bay; and, a first variable-length member diagonally or horizontally between the filter abutment face and filter bay abutment face.

According to yet another embodiment of the present invention, there is provided a kit for adapting a furnace filter bay to receive a furnace filter, the filter bay having a flow of air therethrough, the kit comprising: an adapter for placement within the furnace filter bay comprising a filter abutment face for abutment with at least a portion of the furnace filter and a mounting face parallel to the flow of air; the adapter including attachment means permitting removable attachment of the adapter to the furnace filter bay; and, instructions for attachment and placement of the adapter within the filter bay.

According to still another embodiment of the present invention, there is provided a kit for adapting a furnace filter bay to receive a furnace filter, the filter bay having a flow of air therethrough, the kit comprising: a brace for placement within the furnace filter bay comprising a filter abutment face for abutment with at least a portion of the furnace filter, a mounting face for abutment against an interior portion of the filter bay and a first variable-length member diagonally or horizontally between the filter abutment face and filter bay abutment face; and, instructions for placement of the brace within the filter bay.

In one embodiment, two adapters may be removably attached to the upper and lower (or left and right) interior surfaces of the furnace filter bay proximate the rear or downstream end thereof, just upstream of the filter. The filter is pushed toward the rear of the bay by the flow of air through the filter bay and the adapters prevent the filter from falling forward when the furnace fan cycles off. In another embodiment, two adapters may be removably attached to the upper and lower (or left and right) interior surfaces of the furnace filter bay proximate the front or upstream end thereof, just downstream of the filter. The filter is pushed towards the adapters by the flow of air through the filter bay and the adapters also prevent the filter from falling forward when the furnace fan cycles off.

The adapters may comprise a generally L-shaped piece that is magnetically or adhesively secured to the upper and lower interior surfaces of the bay to hold the filter in place at its top and bottom edges. The cross sectional shape may be square, triangular, semi-circular, quarter round, T-shaped, etc. and the material of construction may be thermoplastic, paper, polyurethane foam, or galvanized steel. A channel may be included for receiving the top and bottom edges of the filter. The mounting face of the adapter may be on a mounting portion of the adapter and a magnet channel face may be provided on an opposite side of the mounting portion from the mounting face. A magnet channel may be provided on the mounting portion, for example on the magnet channel face, and the attachment means may comprise a magnet inserted in the channel. The filter abutment face may alternatively be provided as part of a rectangular frame with top and bottom (and/or left and right) flanges having the mounting face for attachment to the filter bay. The adapters may be provided across the full width of the filter bay, or cover just a portion of the width and may be customized to a desired filter size, for example by cutting to size upon installation.

A single brace may be used as an alternative to the adapter. The brace is not attached to any interior surface of the filter bay, but generally comprises a filter abutment face abutted against a top front edge of the filter, a mounting face abutted against a bottom interior front edge of the filter bay, and a variable-length member oriented diagonally between the two faces. An X-shaped cross section can also be provided by adding a second brace configured in the reverse to the first brace just described and pivotally attaching the two at a central intersection of the variable-length members. In another variation, the filter abutment face is on a rectangular frame and the variable-length member extends horizontally between the bottom of the frame and the mounting face abutting the bottom front edge of the filter bay to form a generally L-shaped insert for the filter bay. In yet another variation, there are two such variable-length members extending from a first rectangular frame, located adjacent the filter when installed in the filter bay, and a second rectangular frame for abutment against a front interior edge or edges of the filter bay.

The filter abutment face of the adapter and/or the filter abutment face of the brace may be keyed with a pattern complementary to a pattern on at least a portion of the furnace filter in order to prevent or impede interchangeability of non-keyed filters with the adapters and/or braces of the present invention.

In yet another embodiment, the aforementioned adapters or braces are provided as component pieces packaged in a kit with instructions for assembly and installation in a furnace filter bay. The instructions may include a direction to cut or size components of the adapter according to the interior dimensions of the filter bay and/or furnace filter. The kit may include one or more conventional furnace filters.

BRIEF DESCRIPTION OF THE DRAWINGS

Having summarized the invention, preferred embodiments thereof will now be described with reference to the accompanying figures, in which:

FIG. 3b is a front view of the set of adapters and filter shown in FIG. 3a;

FIG. 3c is a perspective view of the set of adapters and filter shown in FIG. 3a;

FIG. 8 is a view of a kit for use in making a filter bay accommodate the filter having the second depth shown in FIG. 3a;

FIGS. 13A-C show another kit for use in making a filter bay accommodate the filter having the second depth shown in FIG. 3a.

DETAILED DESCRIPTION

Figure 1:
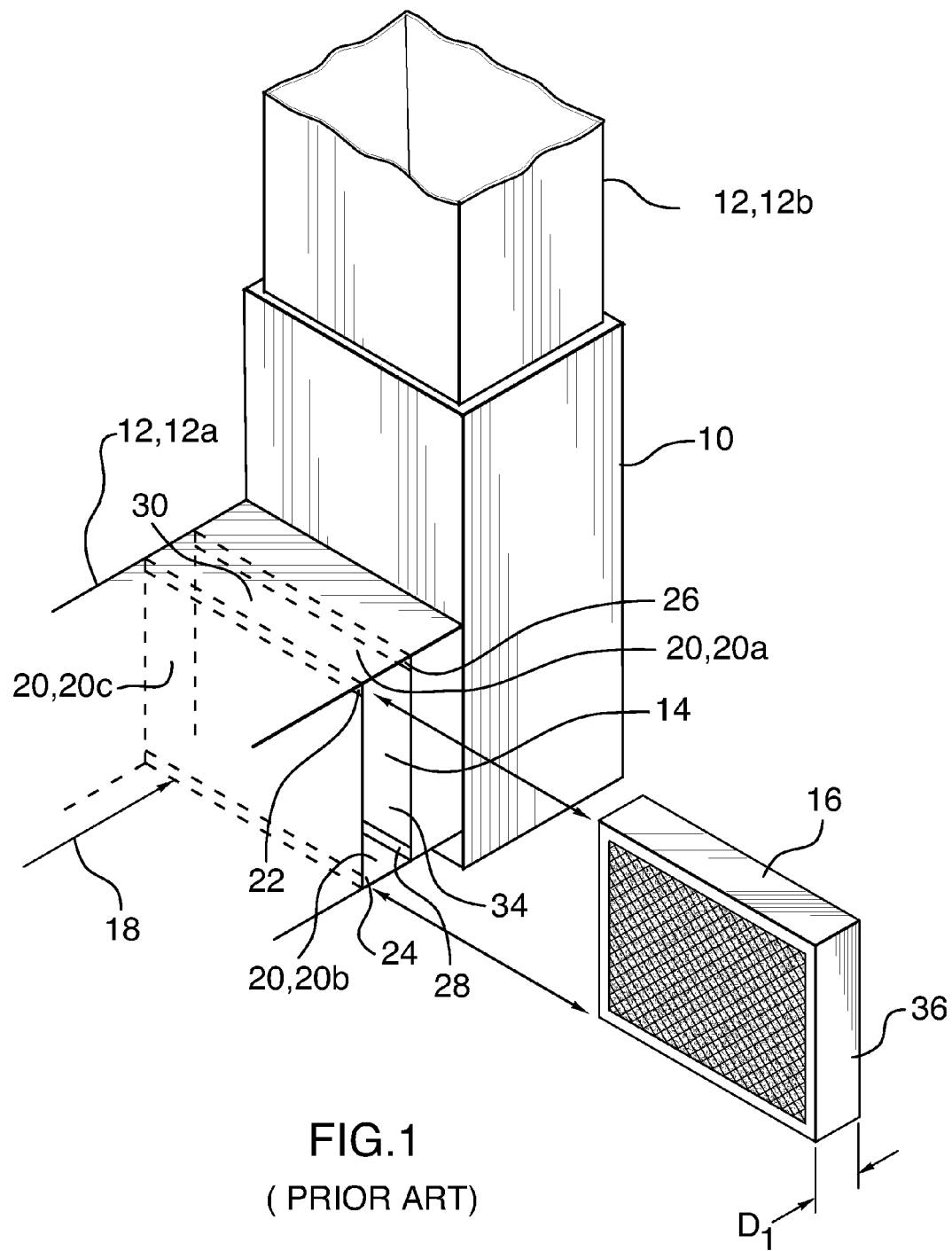
FIG. 1 shows an overall perspective view of a furnace with a prior art filter bay, showing a 4" deep filter being removed therefrom in a semi-exploded view.
Figure 2:
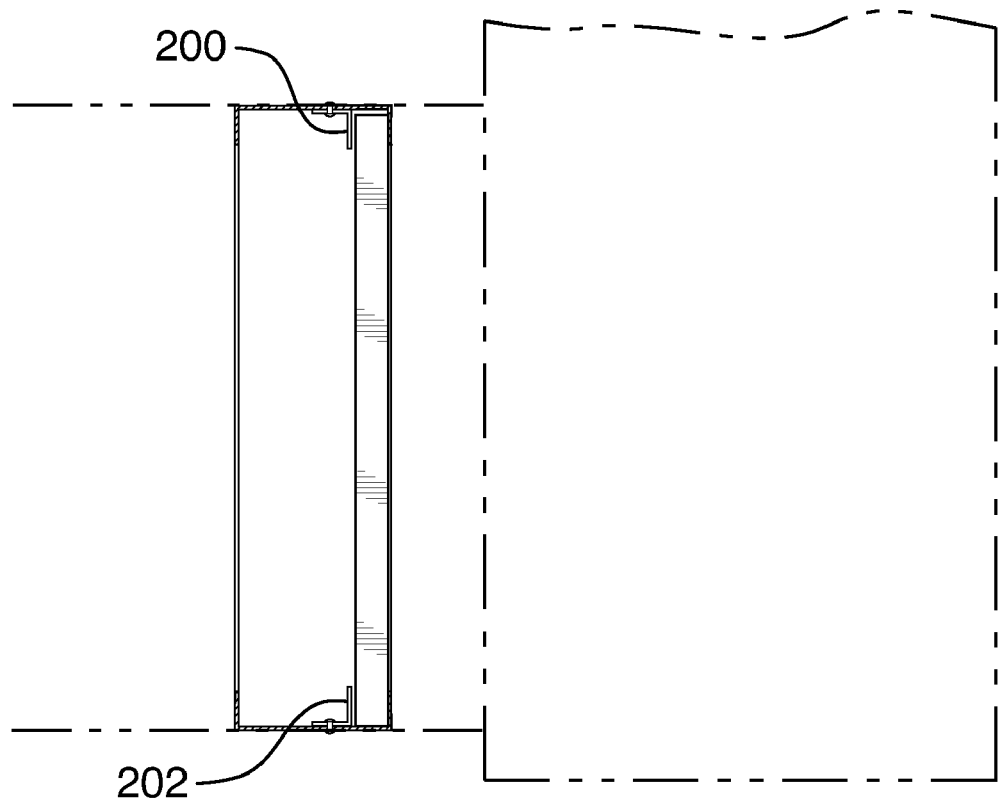
FIG. 2 shows a side view of the filter bay with L-shaped angles pop-riveted to the top and bottom of the filter bay adjacent a 1" filter pushed up against a downstream end of the filter bay.

Reference is made to FIG. 1, which shows an item of ventilation equipment suitable for use in HVAC systems, exemplified by a furnace 10, and associated ducting 12, including an inlet duct 12a and an outlet duct 12b. On the inlet duct 12a, there is a filter bay, exemplified by a furnace filter bay 14, which is configured to hold a filter suitable for use in HVAC equipment, exemplified by a first furnace filter 16. During operation of the furnace 10, a flow of air 18 passes through the inlet duct 12a, through the furnace 10 and out through the outlet duct 12b for distribution as desired. The flow of air 18 therefore passes through the furnace filter bay 14. The furnace filter bay 14 has a rectangular cross-sectional shape and may thus have a set of filter bay walls 20 including first, second and third filter bay walls 20a, 20b and 20c. In embodiments wherein the inlet duct 12a extends horizontally, the first, second and third filter bay walls 20a, 20b and 20c may be referred to as an upper wall, a lower wall and a side wall, respectively. The surfaces of the first, second and third walls 20a, 20b and 20c may be generally parallel to the flow of air 18 that, during use, passes through the inlet duct 12a and therefore through the furnace filter bay 14.

The furnace filter bay 14 includes a first filter bay upstream retainer 22, a second filter bay upstream retainer 24, a first filter bay downstream retainer 26 and a second filter bay downstream retainer 28, for retaining the first furnace filter 16 in position in the inlet duct 12a. The filter bay upstream and downstream retainers 22, 24, 26 and 28 may all be members of a common base 30 that is mounted to the inlet duct 12a. The base 30 may form the upper wall 20a, lower wall 20b and side wall 20c of the furnace filter bay 14.

The furnace filter 16 is installable into the furnace filter bay 14 by means of a furnace filter access aperture 34 in the inlet duct 12a. An edge wall shown at 36 of the housing of the first furnace filter 16 may substantially occupy the area of the furnace filter access aperture 34 so as to inhibit drawing in ambient air through therethrough into the inlet duct 12a during use. Alternatively, a filter bay door (not shown) may be provided and installed over the access aperture 34 once the filter 16 is inserted.

During use, the flow of air 18 is cleaned at least partially of entrained particulate matter (and/or other contaminants) by the first furnace filter 16. The first furnace filter 16 has a first depth D1. The first furnace filter 16 may be of a non-standard, uneasily obtainable size, such as, 14"(height)×25"(width)×4" (depth). In particular, the depth D1 (which may nominally be 4" as noted) may be non-standard and uneasily obtainable.

Persons skilled in the art recognize that furnaces, furnace filter bays and furnace filters are specific examples of items suitable for use in HVAC systems. HVAC systems amenable to use of the present invention need not necessarily include a heating component. As used herein, the terms "furnace", "furnace filter bay", "furnace filter", etc. are meant to denote, in a non-limiting sense, equipment suitable for use in HVAC systems that may or may not include a heating component.

Figure 3A:
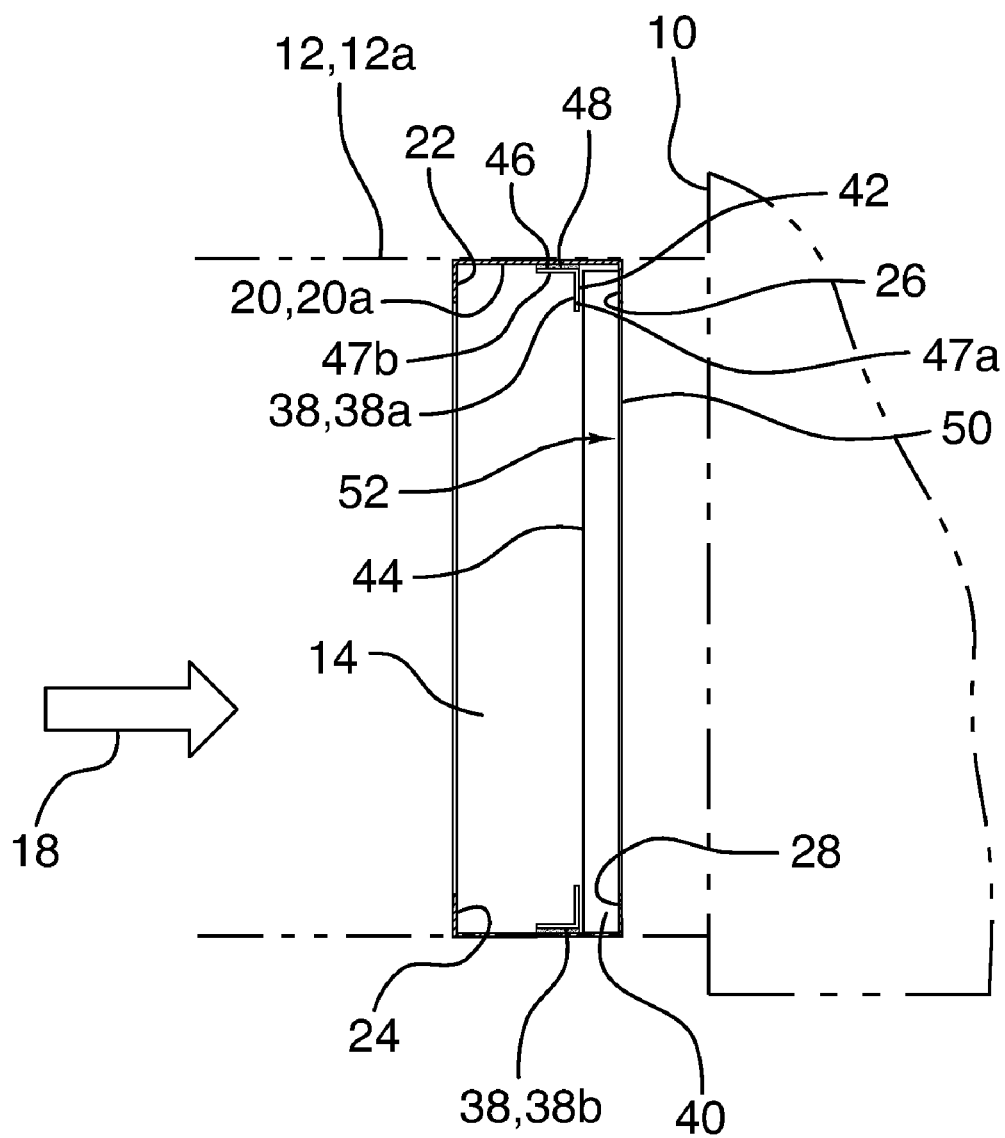
FIG. 3a is a side view of the filter bay shown in FIG. 1, showing a set of adapters installed so that the filter bay can accommodate a filter having a second depth, in accordance with an embodiment of the present invention.

Reference is made to FIG. 3a, which shows the furnace filter bay 14 with a set of adapters 38 installed therein, including a first adapter 38a and a second adapter 38b, which configure the furnace filter bay 14 for receiving a second furnace filter 40 having a second depth D2, in accordance with an embodiment of the present invention. The second depth D2 is less than the first depth D1. More particularly, the second depth D2 may correspond to a second furnace filter 40 that is relatively more standard and is relatively more easily obtainable than the first furnace filter 16 (FIG. 1). For example, the second furnace filter 40 may be 14"(height)×25"(width)×1"(depth), which is a commonly available size of filter.

Each adapter 38 includes a filter abutment face 42, which is positioned to abut the upstream face, shown at 44, of the second furnace filter 40, and a mounting face 46, the surface of which is parallel to the flow of air 18 that passes through the furnace filter bay 14 during use. In the embodiment shown in FIG. 3a, each adapter 38 is made up of a filter abutment portion 47a, which has the filter abutment face 42 thereon, and a mounting portion 47b which has the mounting face 46 thereon. The mounting face 46 is used to mount the adapter 38 to a filter bay wall 20, such as, for example, the upper wall 20a. The mounting face 46 and the filter abutment face 42 may be generally perpendicular to each other.

An attachment means 48 is provided on the mounting face 46 for mounting the adapter 38 to a filter bay wall 20 (e.g. the upper wall 20a). The attachment means 48 may removably join the adapter 38 to the filter bay wall 20 so that at some point, a user can remove the adapter 38 if desired. For example, the user may want to remove the adapter 38 in order to reinstall a first furnace filter 16 (FIG. 1) into the furnace filter bay 14. Also, by making the adapter 38 removably attachable to the furnace filter bay 14, the furnace filter bay 14 is able to accommodate multiple depths of furnace filter, such as the first furnace filter 16, the second furnace filter 40, and a third furnace filter having a third depth (not shown). Additionally, making the adapter 38 removably attachable to the furnace filter bay 14 permits the position of the adapter 38 to be adjusted if necessary after being initially installed. Use of a removable attachment means 48 also permits easy installation without specialized skills or tools. The attachment means 48 may be any suitable type of attachment means, such as, for example, a magnetic strip or a layer of adhesive. The term 'adhesive' is to be understood broadly as meaning any kind of composition that is applied to the mounting face 46 for joining the mounting face 46 to the filter bay wall 20, such as a pressure sensitive adhesive (PSA). A preferred adhesive is of the type used on removable adhesive tape.

Preferably, the adapter 38 is positioned for abutment with the upstream side 44 of the second furnace filter 40, while the pre-existing first and second filter bay downstream retainers 26 and 28 abut and retain the downstream side 50 of the second furnace filter 40. During use, the flow of air 18 exerts a force on the second furnace filter 40 in the downstream direction. By providing the adapter 38 to abut the upstream side 44 of the second furnace filter 40, and by using the pre-existing first and second filter bay downstream retainers 26 and 28 to abut the downstream side 50 of the second furnace filter 40, the first and second adapters are not called upon to hold the second furnace filter 40 against the force from the flow of air 18. Thus, the adapter 38 is subject to a relatively low degree of stress and has a relatively lower likelihood of being torn loose from the furnace filter bay 14. This reduces the need for relatively strong attachment between the adapter 38 and the associated filter bay wall 20, which in turn permits the use of a relatively weak attachment means 48. An advantage of using a relatively weak attachment means 48 is that, in some embodiments, it may be relatively inexpensive. Another advantage is that a weak attachment means 48 permits the adapter 38 to be more easily removed from the furnace filter bay 14 if desired.

Additionally, when the adapter 38 is positioned to cooperate with the first and second filter bay downstream retainers 26 and 28 to hold the second furnace filter 40, the second furnace filter 40 is positioned immediately adjacent the downstream end of the furnace filter bay 14, shown at 52. As a result, any ambient air that is inadvertently drawn into the inlet duct 12a through the furnace filter bay aperture 34 (FIG. 3c) during use of the furnace 10 is drawn in upstream from the second furnace filter 40 and therefore is cleaned by the second furnace filter 40.

Figure 4:
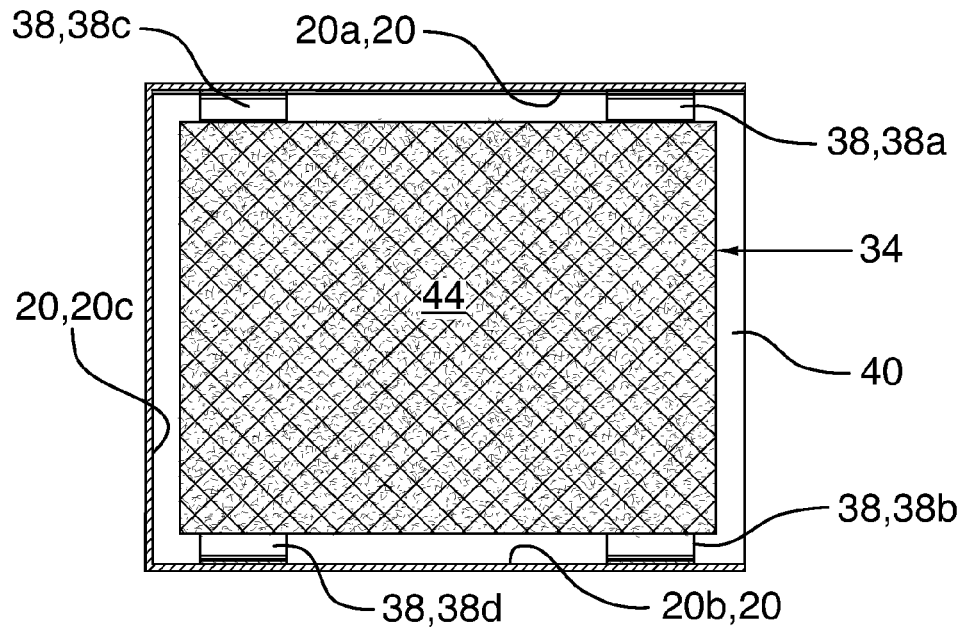
FIG. 4 is a front view of a variant of the set of adapters shown in FIG. 3b.
Figure 3B:
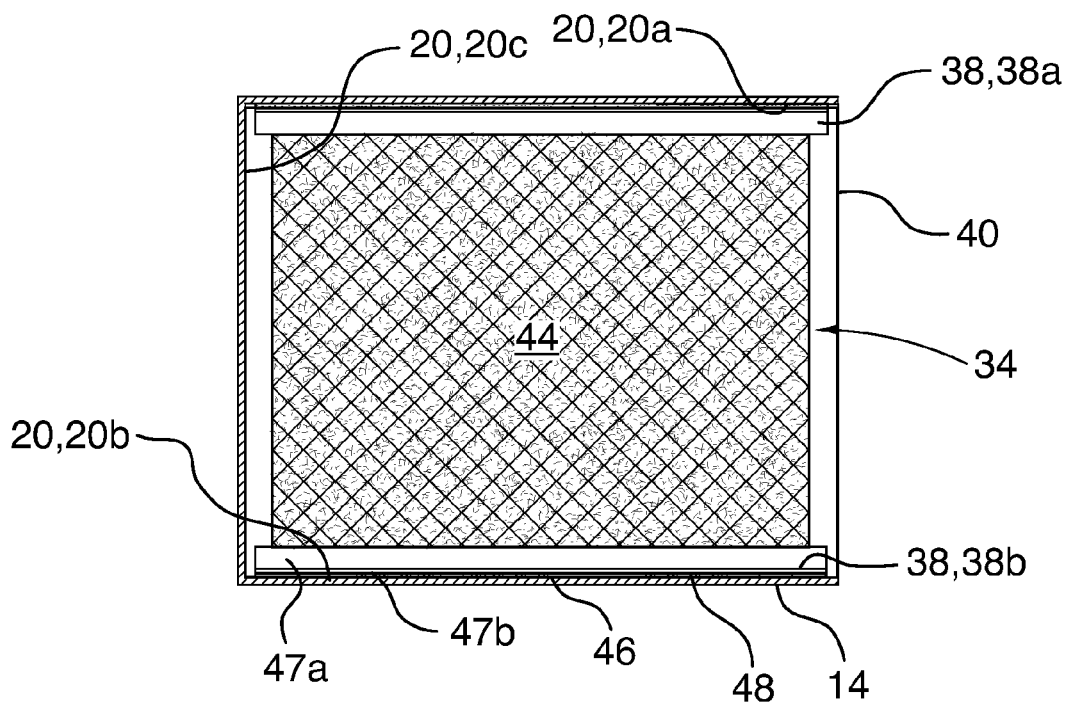
Figure 3C:
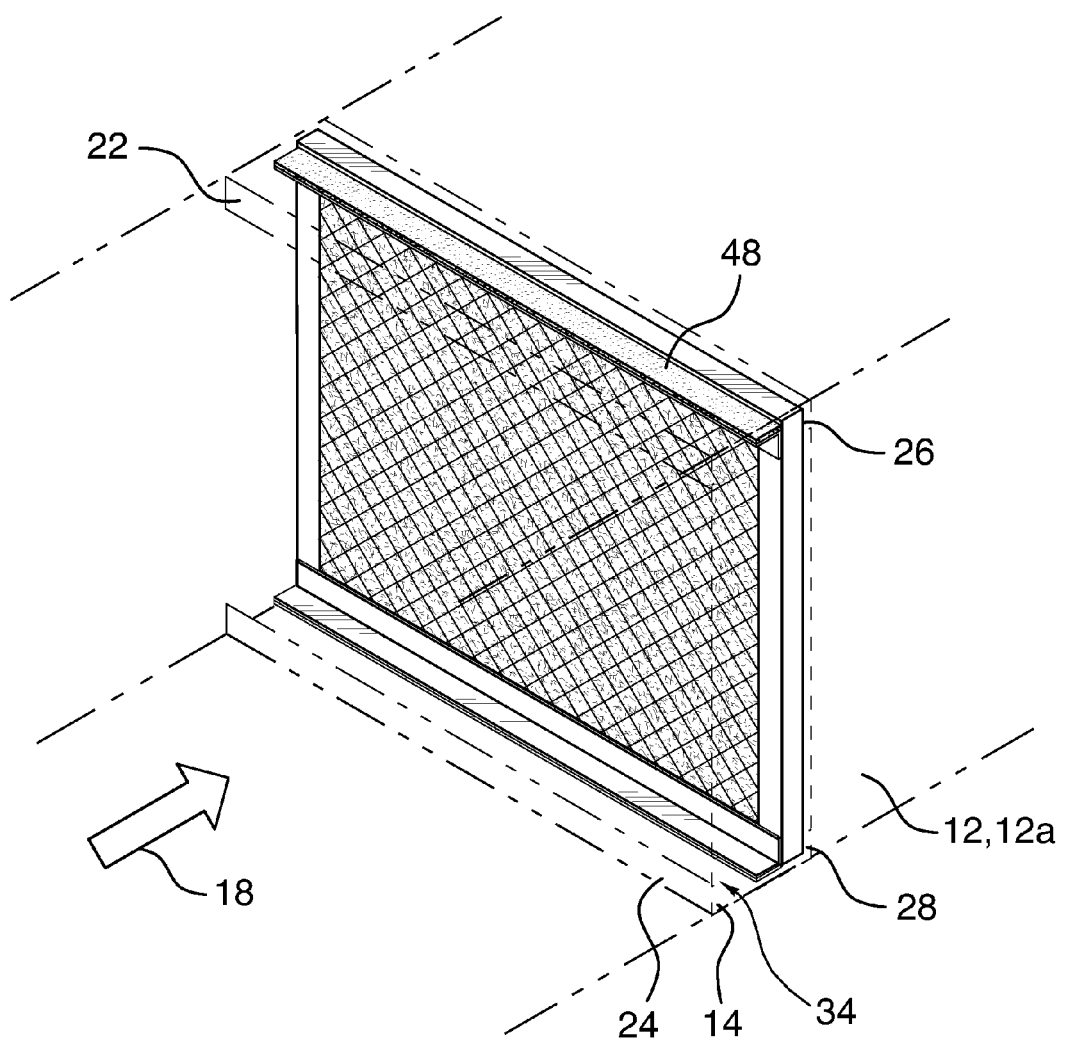

Referring to FIGS. 3b and 3c, each of the first and second adapters 38a and 38b may extend across substantially the entirety of the width of the second furnace filter 40. Alternatively however, referring to FIG. 4, it is possible for each of the first and second adapters 38a and 38b to be relatively short, and for there to be provided an additional two adapters 38c and 38d, each of which may be similar to the first and second adapters 38a and 38b respectively.

It will be noted that the first and second adapters 38a and 38b shown in FIGS. 3a-3c may be identical and may simply be oriented as necessary for use on the upper and lower filter bay walls 20a and 20b. Similar, the adapters 38a, 38b, 38c and 38d shown in FIG. 4 may be identical and may simply be oriented as necessary for use on the upper and lower filter bay walls 20a and 20b.

Figure 5A:
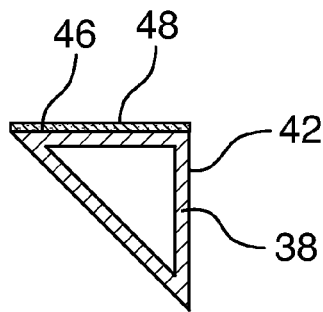
FIG. 5a is a sectional side view of an alternative to the adapter shown FIG. 3a, having a hollow triangular cross-sectional shape.
Figure 5B:
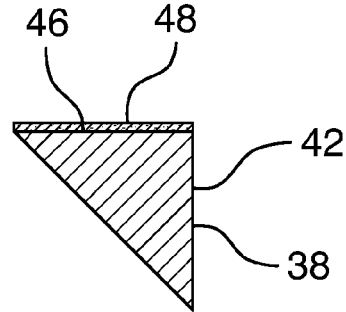
FIG. 5b is a sectional side view of another alternative to the adapter shown FIG. 3a, having a filled triangular cross-sectional shape.
Figure 5C:
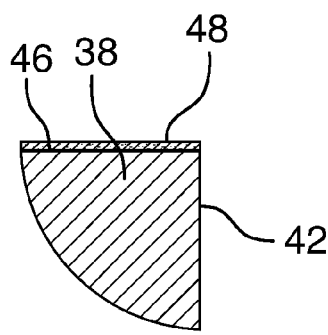
FIG. 5c is a sectional side view of yet another alternative to the adapter shown FIG. 3a, having a filled quarter-circular cross-sectional shape.
Figure 5D:
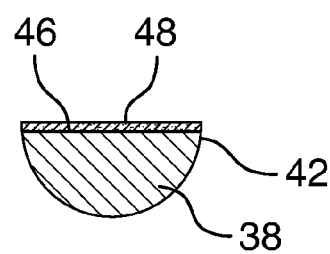
FIG. 5d is a sectional side view of yet another alternative to the adapter shown FIG. 3a, having a filled semi-circular cross-sectional shape.
Figure 5E:
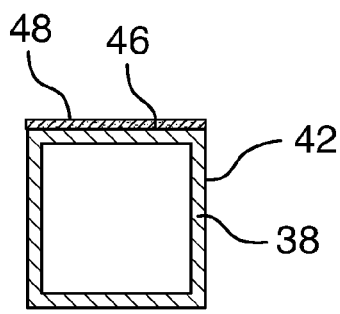
FIG. 5e is a sectional side view of yet another alternative to the adapter shown FIG. 3a, having a hollow square cross-sectional shape.
Figure 5F:
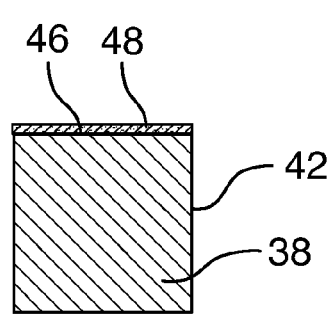
FIG. 5f is a sectional side view of yet another alternative to the adapter shown FIG. 3a, having a filled square cross-sectional shape.
Figure 5G:
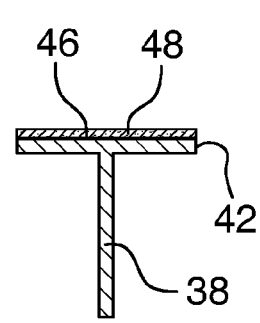
FIG. 5g is a sectional side view of yet another alternative to the adapter shown FIG. 3a, having a T-shaped cross-sectional shape.

Each adapter 38 may have any suitable cross-sectional shape. For example, each adapter 38 may have a generally L-shaped cross-sectional shape and may be made from angle bracket. Other examples of cross-sectional shape are shown in FIGS. 5a-5g. In each figure, the adapter 38 is shown with an attachment means 48. Thus, the cross-sectional shape of the adapter 38 may be a hollow shape (FIGS. 5a and 5e) or a filled shape (FIGS. 5b, 5c, 5d and 5f). The cross-sectional shape may, for example, be triangular (FIGS. 5a, 5b), square (FIGS. 5e, 5f), quarter-circular (FIG. 5c), or semi-circular (FIG. 5d). As can be seen in relation to the embodiment shown in FIG. 5d, the filter abutment face 42 of the adapter 38, which is used to abut the second furnace filter 40 need not be planar (FIG. 5d). As can be seen in relation to the embodiments shown in FIGS. 5d and 5g, the filter abutment face 42 need not extend along the entire height of the adapter 38.

Figure 6:
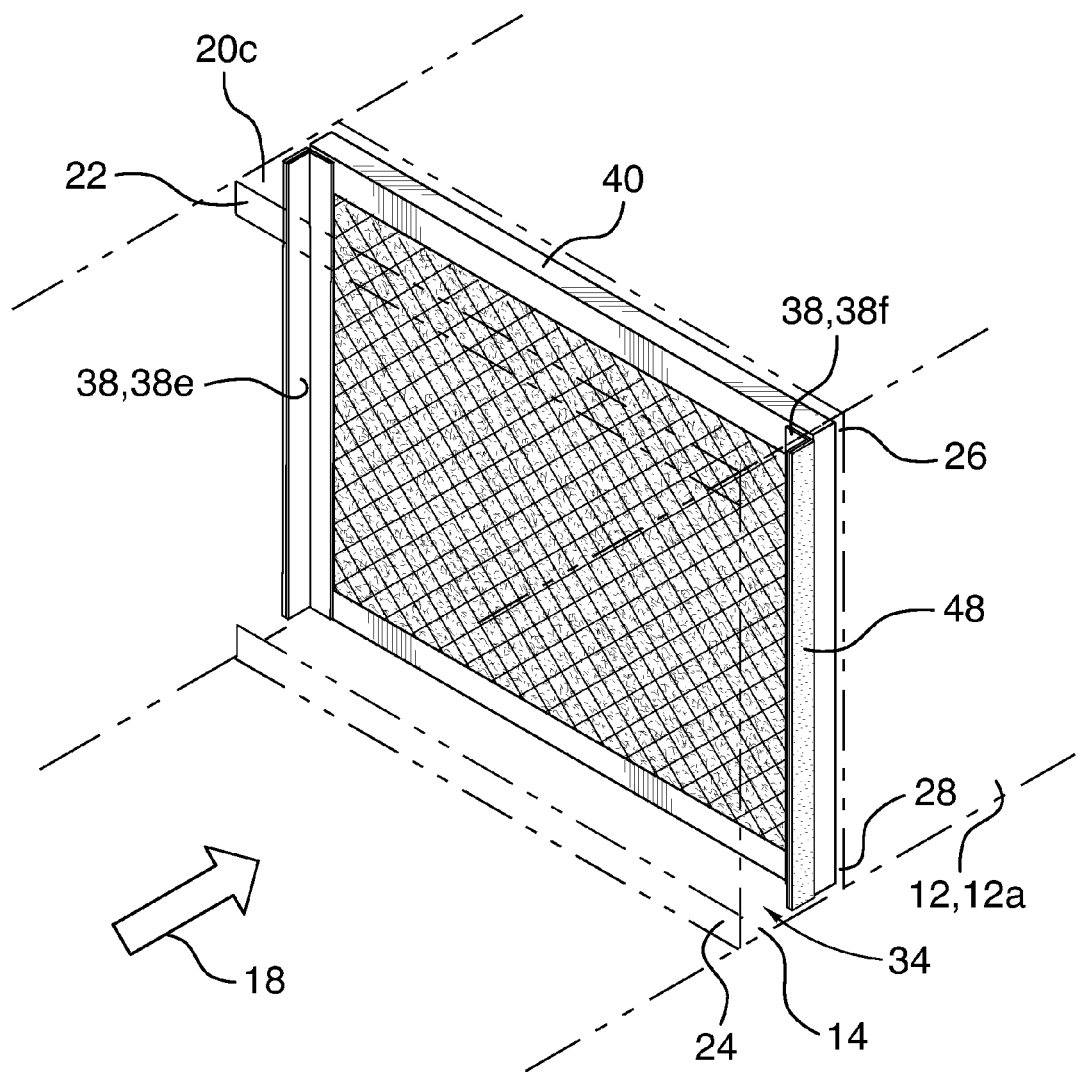
FIG. 6 is a perspective view of a variant of the adapters shown in FIG. 3a, configured to extend vertically in the filter bay.

Reference is made to FIG. 6, in which two adapters 38e, 38f are provided vertically within the interior of the filter bay. Adapter 38e is mounted to the interior wall 20c of the filter bay and adapter 38f is mounted to the removable door (not shown) of the filter bay. The adapters 38e, 38f are otherwise identical to the adapters as previously described.

It has been shown in the figures to provide two or more adapters 38 for installation in the furnace filter bay 14 for retaining the second furnace filter 40. It is alternatively possible to provide a single adapter (not shown) that is configured to retain the second furnace filter 40 in position without the need for any second or subsequent adapter. Such a single adapter is configured to retain the second furnace filter 40 in cooperation with two of the furnace filter bay retainers (e.g. the two downstream retainers 26 and 28). Such a single adapter preferably includes a filter abutment face that extends along a sufficient portion of the height or width of the second furnace filter to substantially prevent the second furnace filter from being inadvertently moved out of position. Preferably, such a single adapter is configured to abut portions of the housing of the second furnace filter 40 so as not to significantly impact on the air flow through the second furnace filter 40.

Figure 7A:
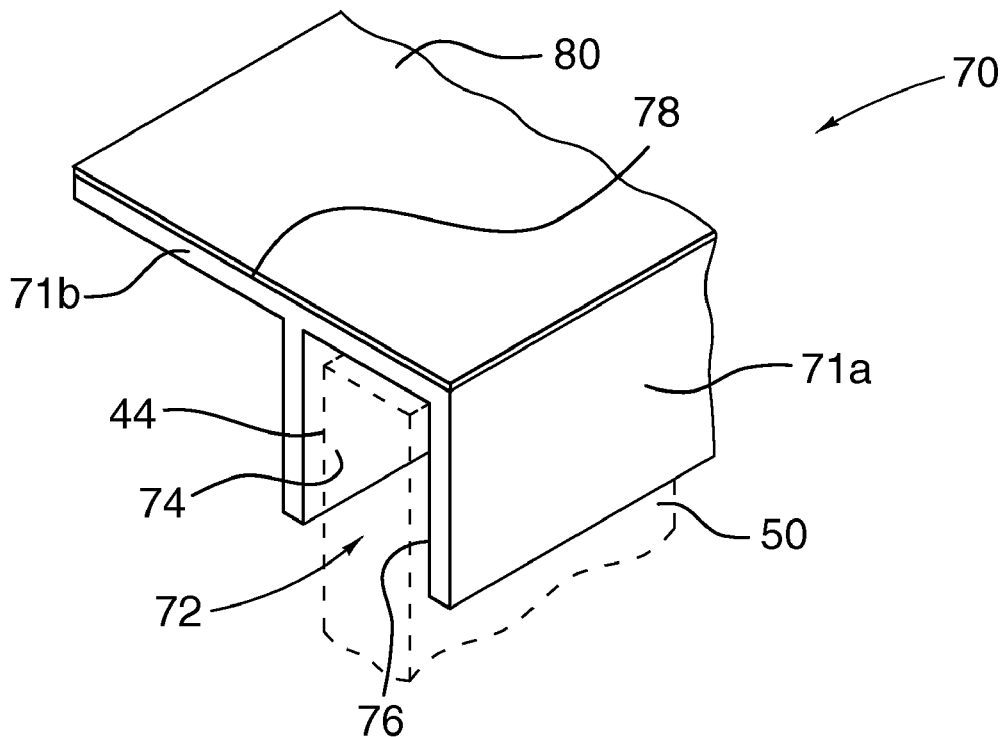
FIG. 7a is a perspective view of an adapter in accordance with another embodiment of the present invention.

Reference is made to FIG. 7a, which shows an adapter 70 in accordance with another embodiment of the present invention. The adapter 70 includes a filter abutment portion 71a and a mounting portion 71b. The filter abutment portion 71a includes a filter channel 72, which has therein a first filter abutment face 74 and a second filter abutment face 76. The first and second filter abutment faces 74 and 76 may be configured to abut the upstream and downstream faces 44 and 50 of the second furnace filter 40 respectively. The mounting portion includes a mounting face 78 that has an attachment means 80 thereon, which may be similar to the attachment means 48 on the adapter 38 shown in FIGS. 3a-3c. The filter channel 72 may extend along one edge of the mounting portion 71b. In this way, the adapter 70 may be installed in the furnace filter bay 14 with the filter channel 72 proximate the downstream end 52 (FIG. 3a) of the furnace filter bay 14, either in abutment with the downstream retainers 26, 28 or spaced apart therefrom.

Figure 7B:
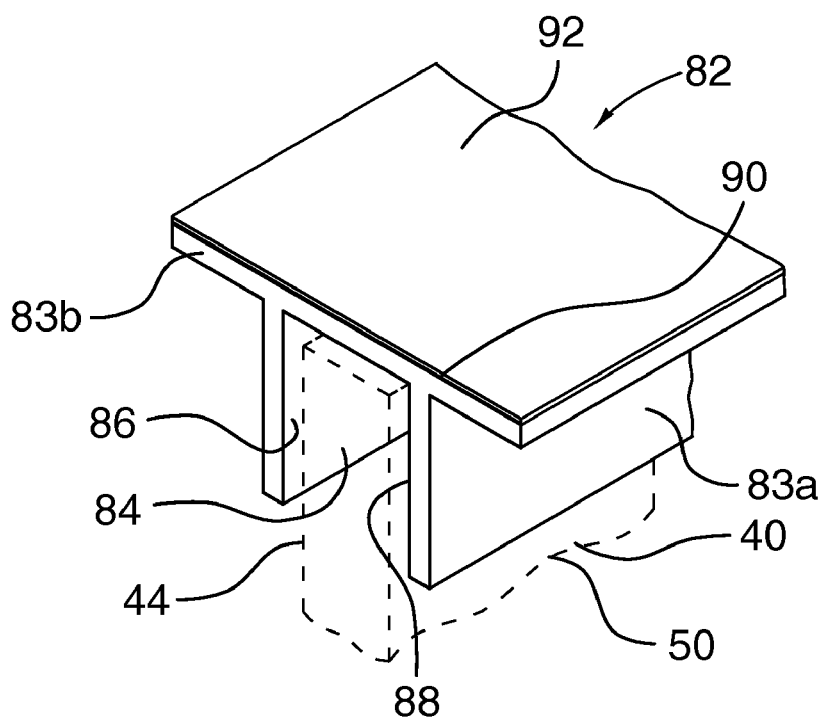
FIG. 7b is a perspective view of another adapter in accordance with yet another embodiment of the present invention.

Reference is made to FIG. 7b, which shows an adapter 82, which may be similar to the adapter 70 (FIG. 7a), and which has a filter abutment portion 83a and a mounting portion 83b. The filter abutment portion 83a includes a filter channel 84, which has first and second filter abutment faces 86 and 88 for abutment with the upstream and downstream faces 44 and 50 of the second furnace filter 40 respectively, and which may be similar to the filter channel 72 (FIG. 7a). The filter channel 84 may be centrally positioned relative to the mounting portion 83b instead of being positioned along one edge of the mounting portion 83b (or potentially offset from center). The mounting portion 83b includes a mounting face 90 with an attachment means 92 thereon, which may be similar to the mounting face 78 and attachment means 80 (FIG. 7a).

Figure 7C:
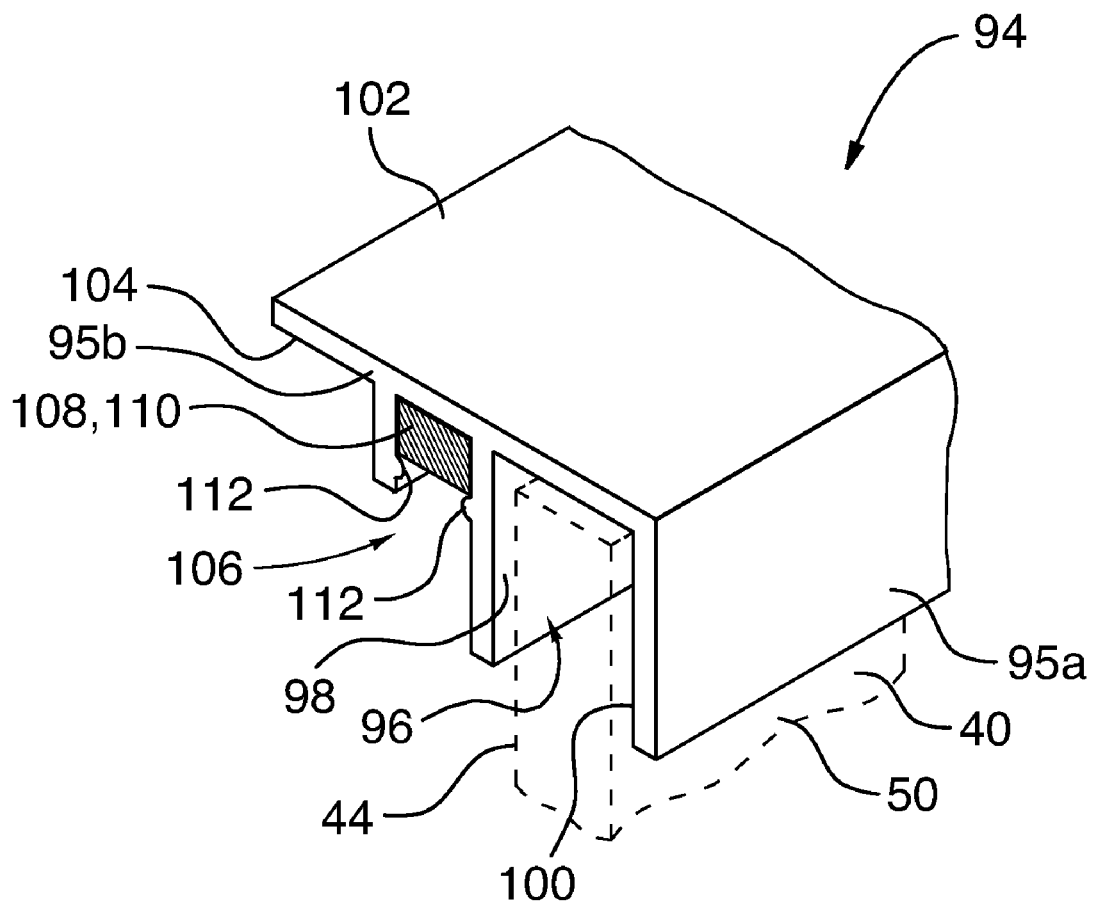
FIG. 7c is a perspective view of another adapter in accordance with yet another embodiment of the present invention.

Reference is made to FIG. 7c, which shows an adapter 94 which may be similar to the adapter 82 (FIG. 7b) and includes a filter abutment portion 95a and a mounting portion 95b. The filter abutment portion 95a may include a filter channel 96 which may be similar to the filter channels 72 and 84 (FIGS. 7a and 7b), and which has first and second filter abutment faces 98 and 100. The mounting portion 95b includes a mounting face 102 which engages the filter bay wall 20. The mounting portion 95b further includes a magnet channel face 104 which is opposed to the mounting face 102 and is separated from the mounting face 102 preferably by only a thin layer of material. This thin layer of material is preferably permeable to magnetic flux. The magnet channel face 104 has thereon a magnet channel 106 for holding a magnet 108, which makes up an attachment means 110 for holding the adapter 94 in position in the furnace filter bay 14. The magnet 108 may have any suitable cross-sectional shape and may be elongated, running the length of the magnet channel 106. Alternatively, there may be a plurality of magnets 108 that are provided in the magnet channel 106. The magnet channel 106 may be immediately adjacent the filter channel 96 as shown. The magnet channel 106 may include a set of retaining ribs 112 to assist in retaining the magnet 108.

While a magnet 108 has been provided as the attachment means 110 in the embodiment shown in FIG. 7c, it is optionally possible to also provide an adhesive on the mounting face 102 to cooperate with the magnet 108 to attach the adapter 94 to a filter bay wall 20.

Figure 7D:
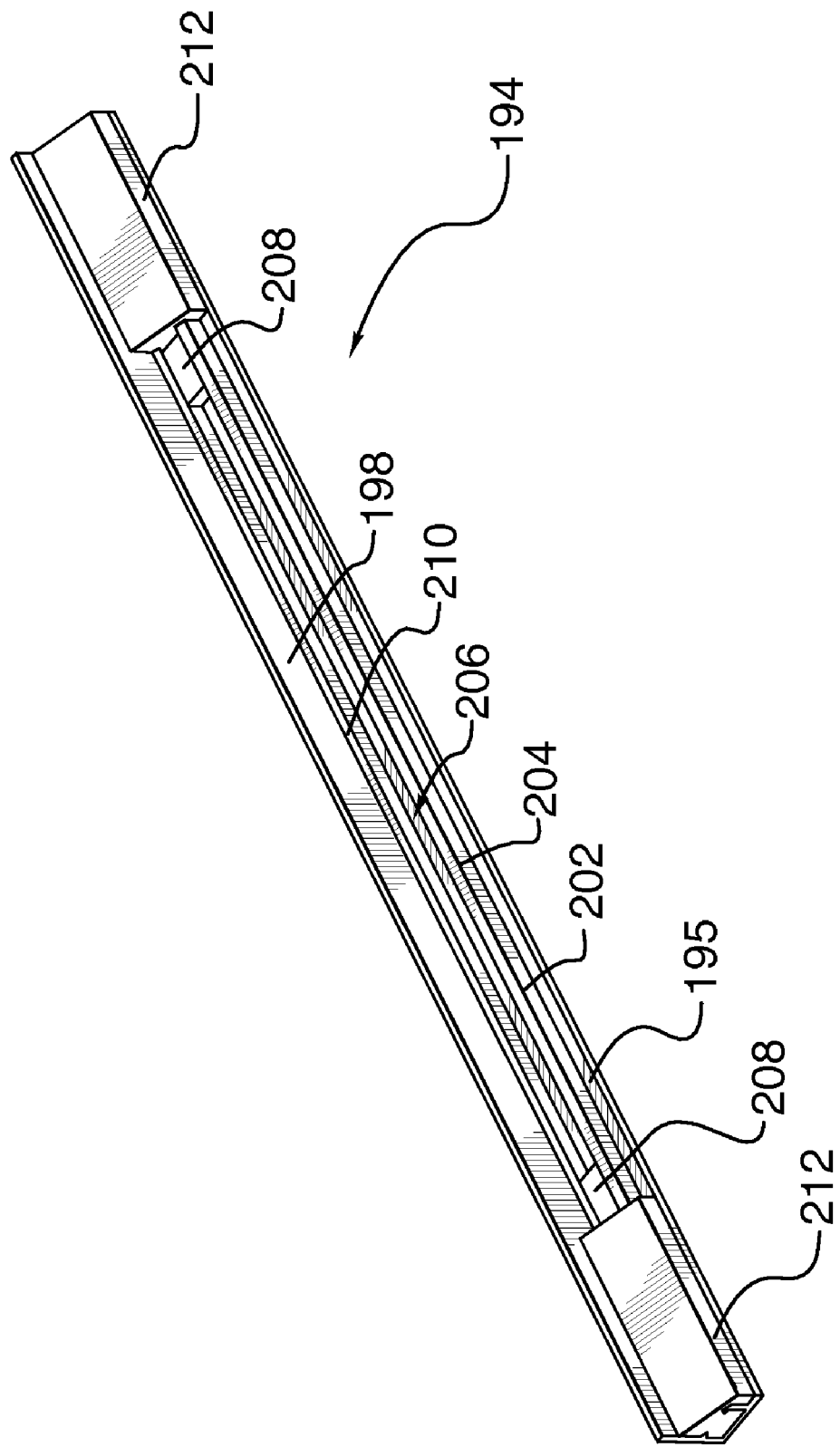
FIG. 7d is a perspective view of another adapter in accordance with yet another embodiment of the present invention.

Referring to FIG. 7d, an alternative embodiment of an adapter 194 is shown, that is similar to the adapter 94 (FIG. 7c), but has only a first filter abutment face 198 and no second filter abutment face. The adapter 194 is positioned such that the filter abutment face 198 is adjacent the upstream edge of the filter to lodge the filter against the downstream retainers of the filter bay in a manner as previously described with reference to FIGS. 3a-c. A magnet channel 206 is formed between the upstream side of the filter abutment face 198 and a protrusion 202, each of which include a lip 210, 204 that overhangs the channel to prevent the magnet 208 from popping out of the channel. The magnet 208 is slid into the magnet channel 206 to a desired position for securing the mounting portion 195 of the adapter 194 within the filter bay. The magnet 208 need not necessarily run along the entire length of the channel 206 and may be pre-cut or cut by an installer of the adapter 194 to an appropriate length for positioning at a desired location. The adapter 194 may optionally be provided with end caps 212 that snap over or into the ends of the adapter to prevent the magnet or magnets 208 from sliding out of the channel 206. The end caps 212 also enhance safety of the adapter 194 by reducing the likelihood of any exposed sharp edges. The end caps 212 can optionally be marked with brand imagery and/or an air flow direction arrow to aid in proper installation of the adapter 194. The magnet 208 may also be so marked.

The filter channel 96 may be centrally positioned, or offset, relative to the mounting portion 95b instead of being positioned along one edge of the mounting portion 95b, in the same manner as described with reference to FIG. 7b.

Figure 8:
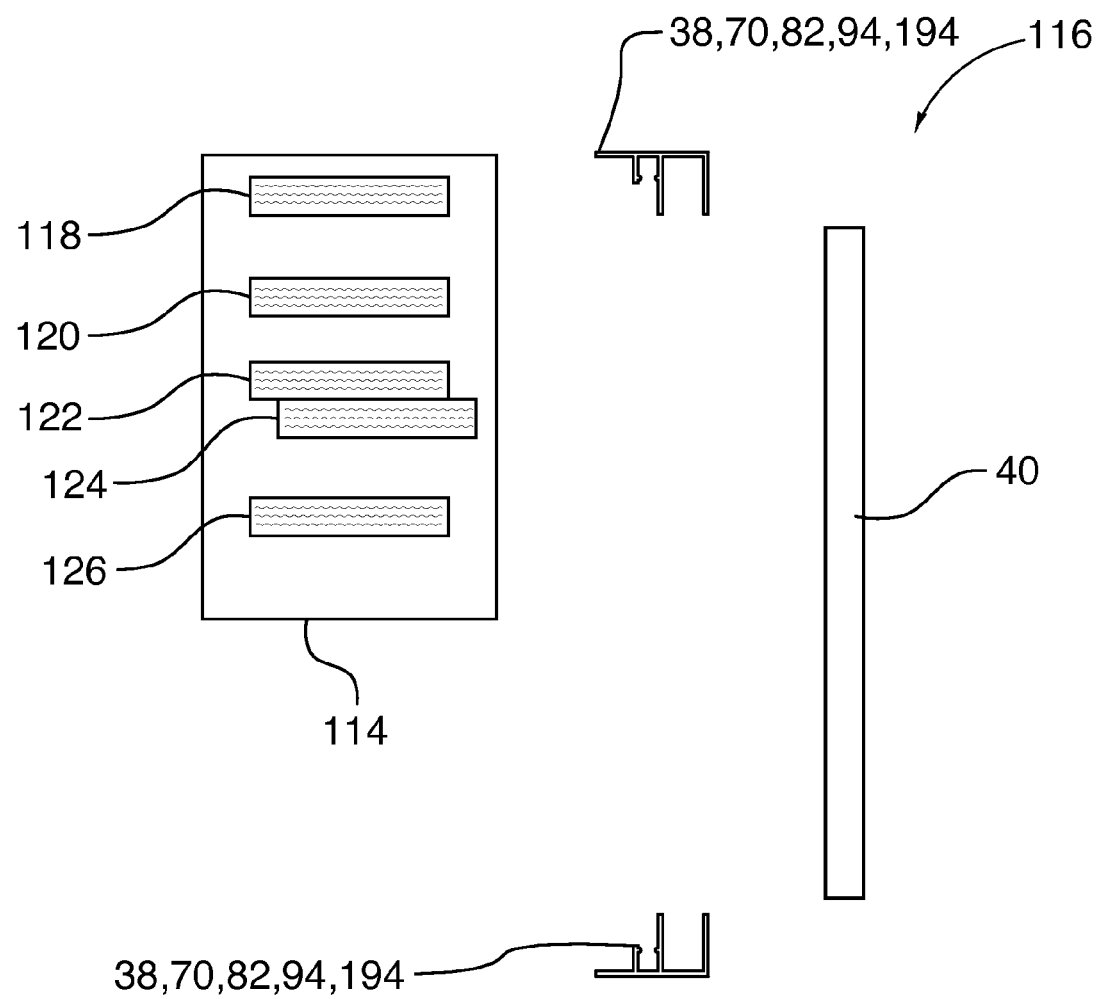

Referring to FIG. 8, at least one adapter 38 may be provided together with a set of instructions shown at 114 containing instructions for attachment and placement of the adapter 38, 70, 82, 94 or 194 within the furnace filter bay 14 (FIG. 3a), as a kit 116 for adapting a furnace filter bay to receive the second furnace filter 40. The kit 116 may include a plurality of adapters 38, 70, 82, 94 or 194 instead of just one. The kit 116 may further include the second furnace filter 40.

The set of instructions 114 may include an instruction 118 to trim the adapter 38 (or each of the adapters if more than one is provided and needs trimming) to a length commensurate with a width or height of the second furnace filter 40 or commensurate with the width or height of the furnace filter bay 14. The set of instructions 114 may further include an instruction 120 to attach the attachment means to the adapter in embodiments wherein the attachment means is not provided on the adapter already. In the case where the kit 116 includes the adapter 94 or 194, the instruction 120 may include an instruction to insert the magnet (or magnets) into the magnet channel and optionally to cut the magnet (or magnets) to an appropriate length and/or to position the magnets within the channel in order to provide sufficient support, stability and magnetic attachment. The set of instructions 114 may further comprise an instruction 122 to attach the adapter to the furnace filter bay 14 (FIG. 3a) at a selected position. The instruction 122 may include an instruction 124 to place the adapter proximate the downstream end 52 (FIG. 3a) of the furnace filter bay 14 so that it is positioned for abutment with at least the upstream face 44 of the second furnace filter 40. The set of instructions 114 may further include an instruction 126 to insert the second furnace filter 40 at the downstream end 52 (FIG. 3a) of the furnace filter bay 14. Where the adapter comprises a filter channel 72, 84 or 96, the set of instructions 114 may further include an instruction 128 to insert the second filter 40 within the filter channel as previously described with reference to FIGS. 7a-c.

Figure 9:
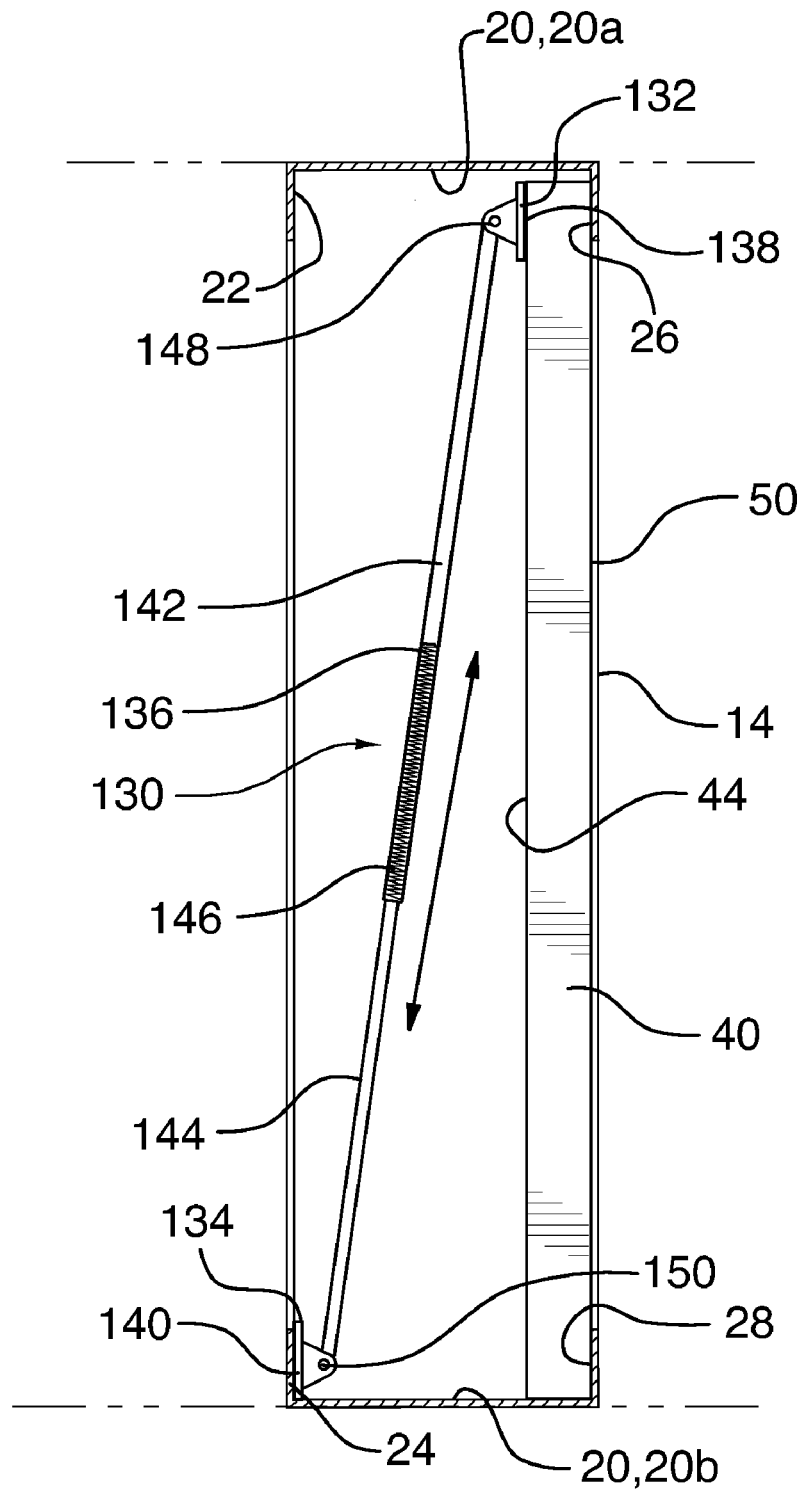
FIG. 9 is a side view of a diagonal brace within a filter bay with a 1" filter in accordance with yet another embodiment of the present invention.

Reference is made to FIG. 9, which shows a furnace filter brace 130 in accordance with another embodiment of the present invention. The furnace filter brace 130 includes a filter abutment member 132, a filter bay abutment member 134 and a variable-length member 136 that extends between the filter abutment member 132 and the filter bay abutment member 134. The filter abutment member 132 includes a filter abutment face 138 for abutment with the second furnace filter 40. The filter bay abutment member 134 includes a furnace filter bay abutment face 140 for abutment with a suitable surface, such as the second filter bay upstream retainer 24. In the embodiment shown in FIG. 9, the furnace filter brace 130 extends diagonally between the second filter bay upstream retainer 24 and the upper edge of the upstream face 44 of the second furnace filter 40. To permit the furnace filter brace 130 to hold the second furnace filter 40 in position, the furnace filter brace 130 is variable in length by means of the variable-length member 136 so that it wedges between a first corner made up of the upper edge of the upstream face 44 of the second furnace filter 40 and the upper filter bay wall 20a, and a second corner made up of the second filter bay upstream retainer 24 and the lower filter bay wall 20b.

In an alternative embodiment of an installation method, the brace 130 may be installed horizontally within the filter bay 14 at a top or bottom thereof. Two braces 130 may be provided horizontally at the top and bottom of the filter bay 14. When the brace 130 is installed at the top of the filter bay 14, the first corner is made up of the upper edge of the upstream face 44 of the second furnace filter 40 and the upper filter bay wall 20a, and the second corner is made up of the second filter bay upstream retainer 24 and the upper filter bay wall 20a. When the brace 130 is installed at the bottom of the filter bay, the first corner is made up of the lower edge of the upstream face 44 of the second furnace filter 40 and the lower filter bay wall 20b, and the second corner is made up of the second filter bay upstream retainer 24 and the lower filter bay wall 20b.

The variable-length member 136 may be variable in length by any suitable means. For example, the variable-length member 136 may be made from first and second segments 142 and 144, which are retractable and extensible with respect to each other, preferably telescopically, and a biasing member 146 that urges the first and second segments to extend. The biasing member 146 may be, for example, a compression spring positioned inside the first segment 142. The rest length of the variable-length member 136 may be sufficiently long that it requires some amount of compression to fit in its position between the second furnace filter 40 and the second filter bay upstream retainer 24. This causes the variable-length member to exert a force on the second furnace filter 40, to hold the second furnace filter 40 in place.

Optionally and preferably, the filter abutment member 132 and the filter bay abutment member 134 are each pivotally connected to a respective end of the variable-length member 136 at pivot joints 148 and 150 respectively. Alternatively, the filter abutment member 132 and the filter bay abutment member 134 may be fixedly connected to the variable-length member 136.

Figure 10:
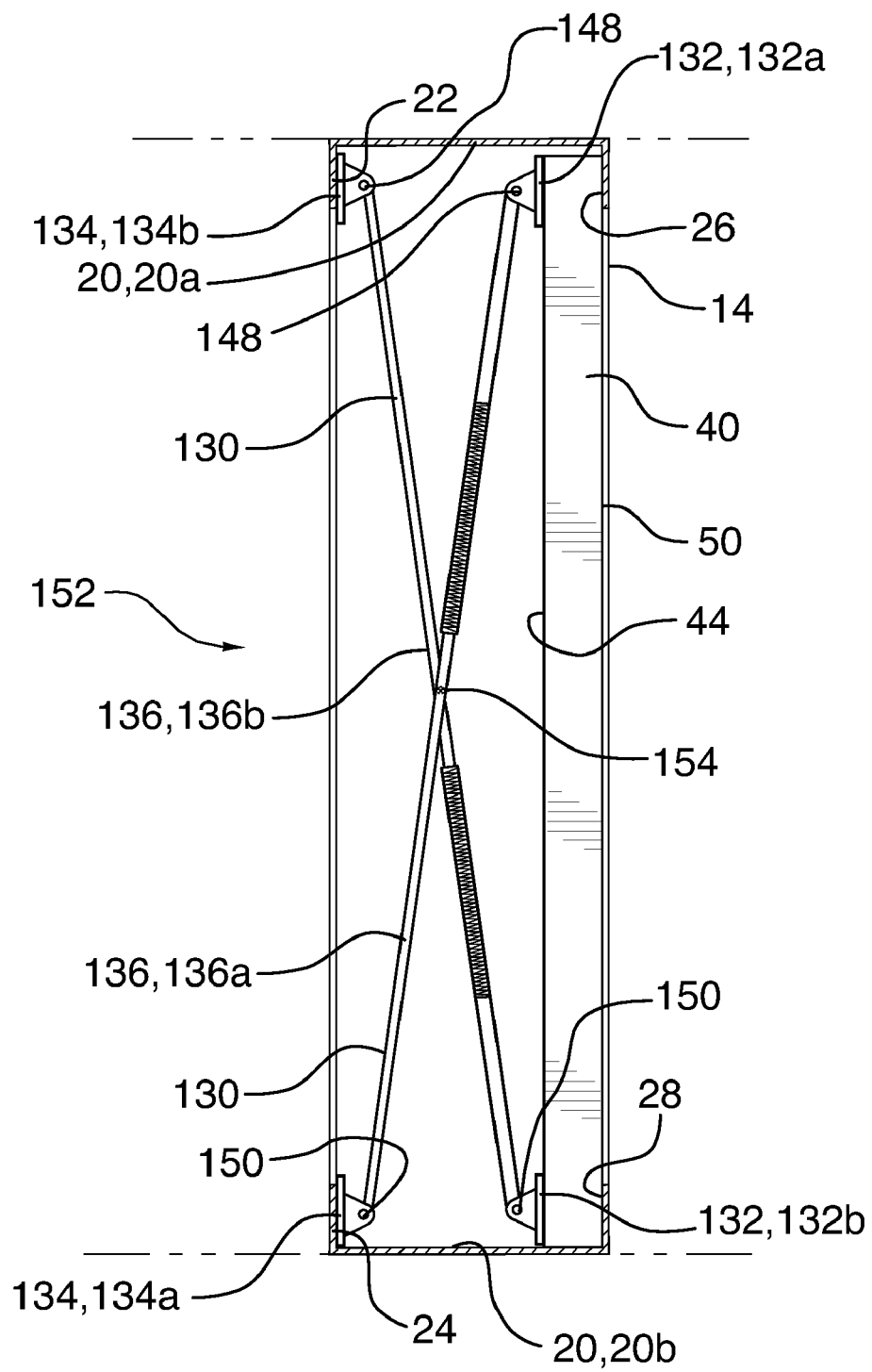
FIG. 10 is a side view of a brace incorporating two of the braces shown in FIG. 9 in accordance with yet another embodiment of the present invention.

Reference is made to FIG. 10, which shows a furnace filter brace 152 that may comprise two furnace filter braces 130, which may be pivotally connected together, and thus includes first and second filter abutment members 132, individually identified at 132a and 132b, first and second filter bay abutment members 134, individually identified at 134a and 134b, and first and second variable-length members 136, individually identified at 136a and 136b. The first filter abutment member 132a abuts the upper edge of the upstream face 44 of the second furnace filter 40. The first filter bay abutment member 134a abuts the second filter bay upstream retainer 24. Thus, the first variable-length member 136a may extend diagonally between the second filter bay upstream retainer 24 and the second furnace filter 40. The second filter abutment member 132b abuts the lower edge of the upstream face 44 of the second furnace filter 40. The second filter bay abutment member 134b abuts the first filter bay upstream retainer 22. The second variable-length member 136b extends diagonally between them.

The first and second variable-length members 136a and 136b may be pivotally connected to each other as shown at a pivot joint 154.

Figure 11:
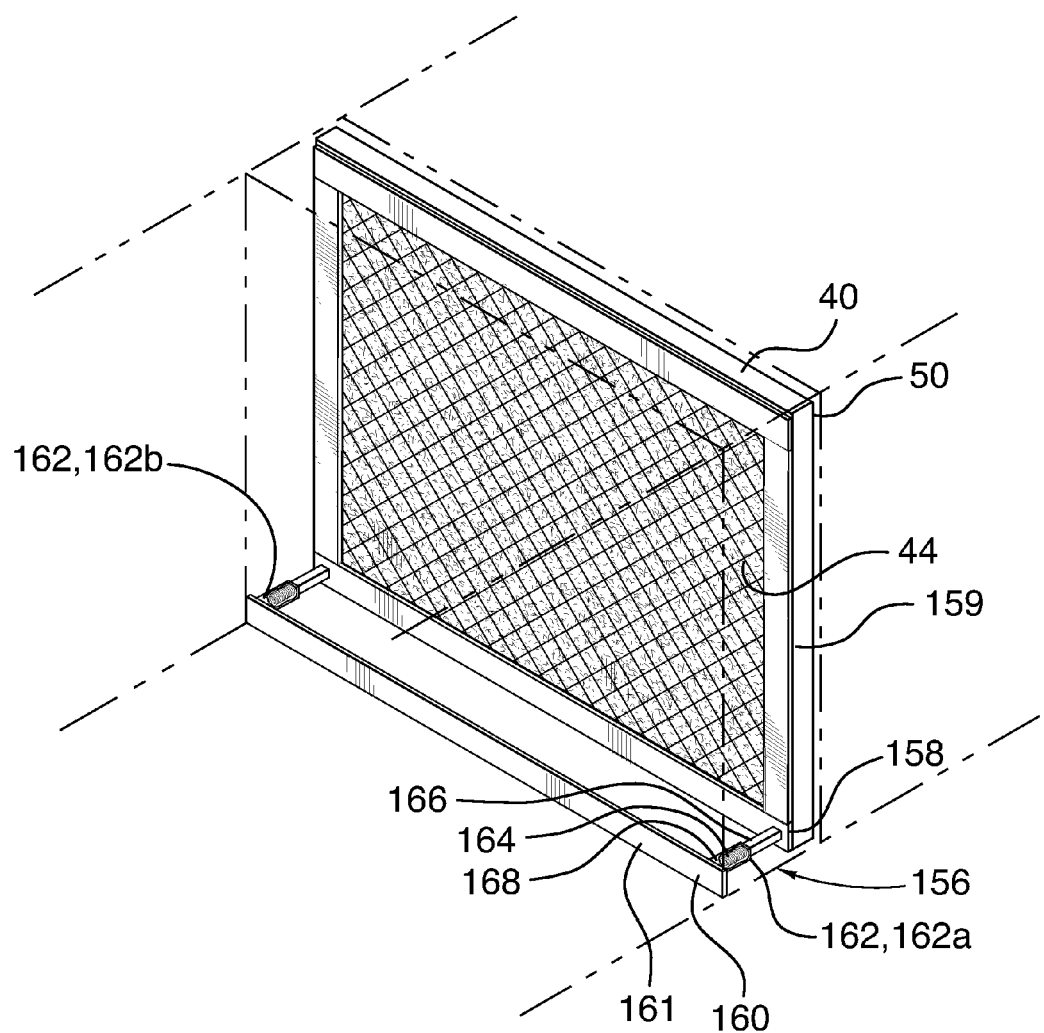
FIG. 11 is a perspective view of another brace in accordance with another embodiment of the present invention.

Reference is made to FIG. 11, which shows a furnace filter brace 156 in accordance with another embodiment of the present invention. The furnace filter brace 156 includes a filter abutment member 158 having a filter abutment face 159, a filter bay abutment member 160 having a filter bay abutment face 161, and first and second variable-length members 162, individually shown at 162a and 162b. The filter abutment member 158 is sized so as not to appreciably occlude the surface area of the second filter 40 available for air flow so as not to increase the pressure drop across the second filter significantly.

The filter abutment member 158 may have any suitable configuration. For example, the filter abutment member 158 may be a substantially rectangular frame that is configured to abut the entire peripheral edge of the upstream face 44 of the second furnace filter 40. The filter bay abutment member 160 may be an elongate strip that is configured to abut substantially the entirety of the second filter bay upstream retainer 24 (FIG. 3a). Persons skilled in the art will recognize that the structure shown in FIG. 11 may be inverted such that the filter bay abutment member 160 abuts the second filter bay upstream retainer 24 (FIG. 3a) along the top edge of the filter bay rather than the bottom edge as shown. Each of the variable length members 162 may include first and second segments 164 and 166 that retract and extend telescopically, and a biasing member 168, such as a compression spring, which is provided inside the first segment 164, that urges the first and second segments to extend.

Similarly to the variable length member 136 shown in FIG. 9, it is preferable that the rest length of the first and second variable-length members 162 is such that they are compressed by some amount to fit between the second furnace filter bay retainer 24 and the second furnace filter 40.

Figure 12:
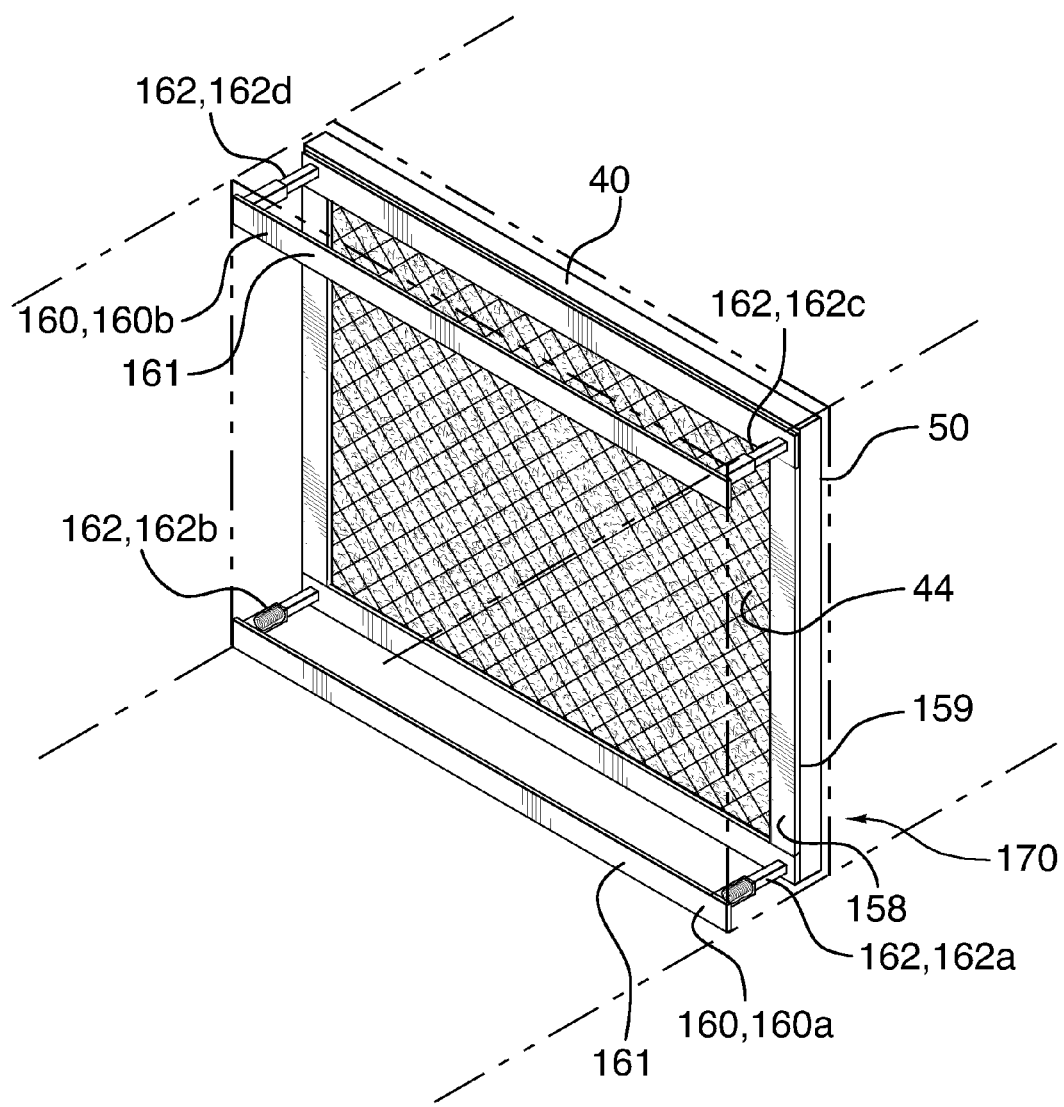
FIG. 12 is a perspective view of a variant of the brace in accordance with another embodiment of the present invention.

Reference is made to FIG. 12, which shows a furnace filter brace 170 that may be similar to the furnace filter brace 156 (FIG. 11) and may include all the same structure as the furnace filter brace 156, but may further include third and fourth variable-length members 162, shown individually at 162c and 162d, and a second filter bay abutment member 160b which may be similar to the first filter bay abutment member 160a. The second filter bay abutment member 160b is configured to abut the first filter bay upstream retainer 22 (FIG. 3a).

Reference is made to FIGS. 13A-C, which show a kit 180 for adapting the furnace filter bay 14 (FIG. 3a) to accommodate the second furnace filter 40. The kit 180 may be similar to the kit 116 (FIG. 8) except that instead of including one or more adapters 38, 70, 82 or 94, the kit 180 (FIG. 13) includes one or more braces 130 or 152, or a brace 156, or a brace 170 and a set of instructions 182 instead of the set of instructions 114. The kit 180 optionally includes the second furnace filter 40.

The set of instructions 182 instruct a user on the installation and operation of the included brace or braces. The set of instructions 182 may include an instruction 184 to insert the second furnace filter 40 at the downstream end 52 of the furnace filter bay 14 (FIG. 3a). The set of instructions 182 may further include an instruction 186 to insert the brace into position. For embodiments wherein the included brace or braces are the braces 130 or 152, the instructions 182 may further specify to insert the brace into position after inserting the second furnace filter 40 into position in the furnace filter bay 14. For embodiments wherein the included brace is the brace 156 or 170, the instructions 182 may further specify that the brace may optionally be inserted in the furnace filter bay 14 (FIG. 3a) before or after the second furnace filter 40.

It will be understood that the second furnace filter 40 may be held in place in the furnace filter bay 14 by a combination of different adapters, such as an adapter 38 along the upper edge of the second furnace filter 40, and an adapter 94 along the bottom edge of the second furnace filter 40. Furthermore, a combination of adapters and braces may be used. For example, an adapter 38 may be used to hold the bottom edge of the second furnace filter 40 and a brace 130 may be used to hold the top edge. Alternatively, a combination of different braces may be used to hold the second furnace filter 40 in position.

While the above description constitutes a plurality of embodiments of the present invention, it will be appreciated that the present invention is susceptible to further modification and change without departing from the fair meaning of the accompanying claims.

The invention claimed is:

1. An adapter for placement within a furnace filter bay having a flow of air therethrough, the filter bay for receiving a furnace filter, the adapter comprising:
   a) a filter abutment face for abutment with at least a portion of the furnace filter;
   b) a mounting face on a mounting portion of the adapter wherein the mounting face is parallel to the flow of air;
   c) at least one magnet on the mounting face permitting removable attachment of the adapter to the furnace filter bay; and
   d) a magnet channel on the mounting portion wherein the at least one magnet is inserted and slidable within the magnet channel.

2. The adapter according to claim 1, wherein the mounting portion has a magnet channel face parallel to and oppositely oriented from the mounting face and wherein the magnet channel is located on the magnet channel face.

3. The adapter according to claim 1, wherein the filter abutment face is perpendicular to the mounting face.

4. The adapter according to claim 1, wherein the filter abutment face is non-planar.

5. A furnace filter brace for placement within a furnace filter bay having a flow of air therethrough, the filter bay for receiving a furnace filter, the brace comprising:
   a) a filter abutment face at a first longitudinal end of the brace for abutment with at least a portion of the furnace filter;
   b) a filter bay abutment face opposite the filter abutment face at a second longitudinal end of the brace for abutment against an interior retainer portion of the filter bay; and,
   c) a first variable-length member diagonally or horizontally between the filter abutment face and filter bay abutment face.

6. The brace of claim 5, wherein the filter abutment face is on a rectangular frame.

7. The brace of claim 5, further comprising a second variable-length member between the first filter abutment face and the filter bay abutment face.

8. The brace of claim 7, wherein the filter bay abutment face is a first filter bay abutment face and wherein the brace further comprises:
   a) a second filter bay abutment face; and
   b) a third variable-length member and a fourth variable length member, wherein the third and fourth variable-length members extend between the filter abutment face and the second filter bay abutment face.

9. The brace of claim 5, wherein the filter abutment face is a first filter abutment face, the filter bay abutment face is a first filter bay abutment face, the interior retainer portion is a first interior retainer portion, and wherein the brace further comprises:
   a) a second filter abutment face for abutment with at least a portion of the furnace filter, the second filter abutment face parallel with the first filter abutment face;
   b) a second filter bay abutment face for abutment with a second interior retainer portion of the filter bay; and
   c) a second variable-length member between the second filter abutment face and the second filter bay abutment face pivotally connected to the first variable-length member.

10. A kit for adapting a furnace filter bay to receive a furnace filter, the filter bay having a flow of air therethrough, the kit comprising:
   a) an adapter for placement within the furnace filter bay including a filter abutment face for abutment with at least a portion of the furnace filter and a mounting face parallel to the flow of air, wherein the mounting face is on a mounting portion of the adapter, the mounting portion having a magnet channel face parallel to and oppositely oriented from the mounting face, the adapter further including a magnet channel on the magnet channel face;
   b) at least one magnet permitting removable attachment of the adapter to the furnace filter bay; and,
   c) a set of instructions for attachment and placement of the adapter within the filter bay wherein the set of instructions include an instruction to insert the at least one magnet in the magnet channel.

11. The kit according to claim 10, wherein the kit further comprises the furnace filter.

12. The kit according to claim 10, wherein the kit comprises at least two adapters.

13. The kit according to claim 10, wherein the set of instructions includes instructions to:
  a) cut the at least one magnet to a desired length prior to positioning the at least one magnet in the magnet channel;
  b) place the adapter proximate a downstream end of the filter bay such that the filter abutment face abuts the furnace filter when inserted at the downstream end of the filter bay; and,
  c) insert the furnace filter at the downstream end of the filter bay.

14. A kit for adapting a furnace filter bay to receive a furnace filter, the filter bay having a flow of air therethrough, the kit comprising:
  a) a brace for placement within the furnace filter bay including a filter abutment face at a first longitudinal end of the brace for abutment with at least a portion of the furnace filter and a filter bay abutment face opposite the filter abutment face at a second longitudinal end of the brace for abutment with a portion of the filter bay;
  b) a first variable-length member diagonally or horizontally between the filter abutment face and the filter bay abutment face; and
  c) a set of instructions for placement of the brace within the filter bay.

15. The kit according to claim 14, wherein the kit further comprises the furnace filter.

16. The kit according to claim 14, wherein the kit comprises at least two braces.

17. The kit according to claim 14, wherein the set of instructions includes instructions to:
  a) insert the furnace filter at the downstream end of the furnace filter bay; and
  b) insert the brace into position in the furnace filter bay.

18. The kit according to claim 17, wherein the instructions specify to carry out step a) prior to carrying out step b).

19. The adapter according to claim 1 wherein the at least one magnet comprises a plurality of magnets.

20. The adapter according to claim 19 wherein the plurality of magnets comprises two magnets.

21. The adapter according to claims 1 or 10 further comprising two end caps for retaining the at least one magnet within the magnet channel.

22. The adapter according to claim 21 wherein each end cap comprises a marking comprising an air flow direction indicator.

* * * * *